United States Patent
Won et al.

(10) Patent No.: US 10,731,755 B2
(45) Date of Patent: Aug. 4, 2020

(54) METHOD OF CONTROLLING DRIVING OF CVT VEHICLE DURING CORNERING

(71) Applicants: Hyundai Motor Company, Seoul (KR); Kia Motors Corp., Seoul (KR)

(72) Inventors: Chan Hee Won, Seoul (KR); Sung Hwa Jeong, Yongin-si (KR); Woo Il Chang, Hwaseong-si (KR); Hyung Hee Lee, Yongin-si (KR); Jun Sung Park, Yongin-si (KR); Ho Young Kim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 218 days.

(21) Appl. No.: 16/001,704

(22) Filed: Jun. 6, 2018

(65) Prior Publication Data
US 2019/0170248 A1 Jun. 6, 2019

(30) Foreign Application Priority Data
Dec. 6, 2017 (KR) .......................... 10-2017-0166713

(51) Int. Cl.
*F16H 61/662* (2006.01)
*F16H 61/02* (2006.01)
*F16H 59/44* (2006.01)
*F16H 59/42* (2006.01)
*F16H 59/70* (2006.01)
(Continued)

(52) U.S. Cl.
CPC ....... *F16H 61/662* (2013.01); *F16H 61/0213* (2013.01); *F16H 59/42* (2013.01); *F16H 59/44* (2013.01); *F16H 59/54* (2013.01); *F16H 59/58* (2013.01); *F16H 59/70* (2013.01); *F16H 2059/704* (2013.01); *F16H 2061/022* (2013.01); *F16H 2061/0234* (2013.01); *F16H 2061/66218* (2013.01)

(58) Field of Classification Search
CPC .......... F16H 59/42; F16H 59/44; F16H 59/58; F16H 2059/704; F16H 61/662; F16H 2061/022; F16H 2061/0234; F16H 2061/66218
See application file for complete search history.

(56) References Cited

U.S. PATENT DOCUMENTS 5,287,772 A * 2/1994 Aoki ........................ B60K 1/00
                                                                      180/165
6,070,118 A * 5/2000 Ohta ....................... G01C 21/26
                                                                      701/65
(Continued)

FOREIGN PATENT DOCUMENTS

KR 10-2017-0117544 A 10/2017

*Primary Examiner* — Edwin A Young
(74) *Attorney, Agent, or Firm* — Morgan, Lewis & Bockius LLP

(57) ABSTRACT

A method of controlling driving of a CVT vehicle during cornering performed by a controller, may include determining whether it is necessary to perform an auxiliary control process to enhance a re-acceleration response after entering the corner, by determining a travelling state of the vehicle; setting a target gear ratio instead of a gear ratio obtained based on a shift pattern when the determining produces an affirmative result indicating that it is necessary to perform the auxiliary control process; and performing gear shifting of a CVT to follow the target gear ratio set in the setting of the gear ratio.

6 Claims, 4 Drawing Sheets

(51) Int. Cl.
  *F16H 59/58* (2006.01)
  *F16H 59/54* (2006.01)

(56) References Cited

U.S. PATENT DOCUMENTS

| | | | |
|---|---|---|---|
| 6,188,945 B1* | 2/2001 | Graf | B60W 30/188 |
| | | | 701/58 |
| 2010/0100293 A1* | 4/2010 | Takanami | F16H 61/0213 |
| | | | 701/65 |
| 2015/0051802 A1* | 2/2015 | Saitoh | F16H 61/16 |
| | | | 701/60 |

* cited by examiner

METHOD OF CONTROLLING DRIVING OF CVT VEHICLE DURING CORNERING

CROSS REFERENCE TO RELATED APPLICATION

The present application claims priority to Korean Patent Application No. 10-2017-0166713, filed Dec. 6, 2017, the entire contents of which is incorporated herein for all purposes by this reference.

BACKGROUND OF THE INVENTION

Field of the Invention

The present invention relates to a method of controlling driving of a vehicle provided with a continuously variable transmission (CVT) and, more particularly, to a method of controlling driving of a CVT vehicle especially during cornering of the CVT vehicle.

Description of Related Art

In recent years, for vehicle makers, development of vehicles with improved fuel economy and complying with environment-friendly policies has become a key goal. As a result, vehicles mounted with a continuously variable transmission (CVT) are increasing.

Furthermore, to improve fuel economy, there is an attempt to increase a driving speed range within which a vehicle is driven with a damper clutch of a torque converter directly engaged with a crank shaft of an engine, and high-speed-based (i.e., low gear ratio-based) shift settings are becoming common. Although such a setting is effective in terms of fuel economy, it has a disadvantage of deteriorating drivability.

That is, since a continuously variable transmission (CVT) has a characteristic of exhibiting a significantly larger inertia force than other transmissions within a high speed range (low gear ratio range), the CVT is a main cause of a great power loss during downshifting for re-acceleration because initial power is used to overcome the large inertia force of the CVT and the CVT does not allow a skip downshift unlike other transmissions such as an automatic transmission (AT) and a dual-clutch transmission (DCT). Moreover, since the damper clutch is directly connected to the crankshaft of the engine, it takes much time to reach an engine speed at which the engine can output its maximum power and exhibits its highest performance, which leads to a main cause of deterioration of an acceleration response of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling driving of a CVT vehicle during cornering, the method facilitating the vehicle to be prepared for a re-acceleration operation which is to be performed after entering a corner, at the time of entering the corner, reducing the power loss of the engine caused by the large inertia of a CVT and improving an acceleration response of the vehicle.

According to one aspect of the present invention, there is provided a method of controlling driving of a CVT vehicle during cornering, the method being performed by a controller and including: determining whether or not it is necessary to perform an auxiliary control process to enhance a re-acceleration response after the vehicle enters the corner, by determining a travelling state of the vehicle; setting a target gear ratio instead of a gear ratio which is determined according to a shift pattern when the determining produces an affirmative result indicating that it is necessary to perform the auxiliary control process; and performing gear shifting such that an actual gear ratio of a continuously variable transmission (CVT) follows the target gear ratio.

The determining may produce the affirmative result indicating that it is necessary to perform the auxiliary control process, when the following conditions are satisfied: a vehicle speed is greater than a first reference vehicle speed; the gear ratio of the CVT is less than a first reference gear ratio; a brake pressure is greater than a reference brake pressure; an absolute value of a steering angle is greater than a first reference steering angle; and a driving pulley RPM is less than a first reference RPM.

In the determining, it is determined that it is necessary to release the auxiliary control process when the vehicle speed is equal to or less than a second reference vehicle speed, when the gear ratio of the CVT is equal to or greater than a second reference gear ratio, when the gear ratio of the CVT is equal to or greater than a control target gear ratio determined to control the CVT to follow the target gear ratio, when a state in which an absolute value of a steering angle is equal to or less than a second reference steering angle continues for a predetermined holding time or longer, or when a driving pulley target RPM obtained based on the shift pattern is equal to or greater than a second reference RPM.

The setting of the gear ratio may be performed by setting, as the target gear ratio, a value obtained by dividing a driving pulley control target RPM obtained from a map having absolute values of a brake pressure and a steering angle as independent variables and a driving pulley control target RPM as a dependent variable, by a driven pulley RPM.

The setting of the gear ratio may be performed by setting, as the target gear ratio, a value obtained by dividing a driving pulley control target RPM obtained from a map having a vehicle speed and a driving mode as independent variables and a driving pulley control target RPM as a dependent variable, by a driven pulley RPM.

The performing of the gear shifting may be configured such that the gear shifting is performed at a speed set for a sports mode regardless of a driving mode set currently.

According to an exemplary embodiment of the present invention, it is possible to allow a vehicle to be prepared for a re-acceleration operation in advance after entering a corner, reducing a power loss that occurs when the vehicle overcomes the large inertia force of a CVT at the time of performing an acceleration operation and improving an acceleration response of the vehicle to the extent required by a driver.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
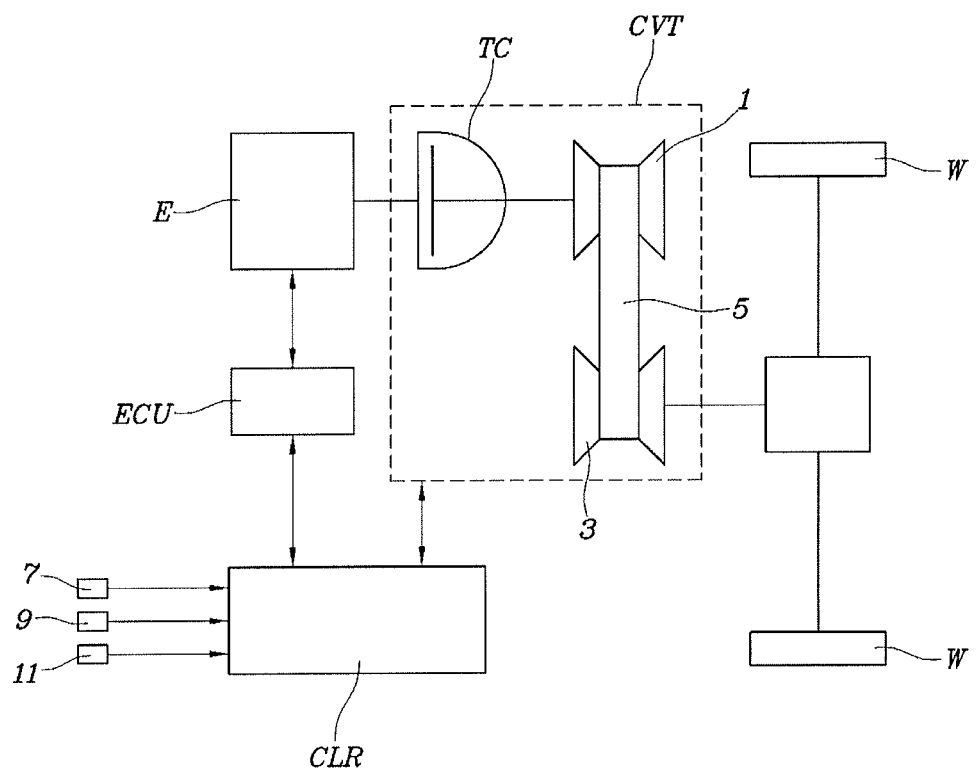
FIG. 1 is a diagram illustrating the schematic construction of a continuously variable transmission (CVT) vehicle to which a control method of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described more specifically with reference to the accompanying drawings. Throughout the drawings, the same reference numerals will refer to the same or like parts.

FIG. 1 is a diagram illustrating the schematic construction of a continuously variable transmission (CVT) vehicle to which a control method of the present invention is applied. The vehicle is configured such that the power of an engine E is converted via a continuously variable transmission (CVT) and the resulting power is transferred to the driving wheels W of the vehicle. The CVT receives the power of the engine E via a torque converter TC and continuously changes a gear ratio consecutively via a driving pulley 1, a driven pulley 3, and a belt 5, so that the resulting power is transferred to the driving wheels W.

The vehicle may include a controller CLR which is configured to receive information on a travelling state of the vehicle from a vehicle speed sensor 7, a steering angle sensor 9, a brake pressure sensor 11, and the like and to indirectly control the engine E via an engine control unit (ECU). The controller CLR also controls the driving pulley 1 and the driven pulley 3 of the CVT.

Figure 2:
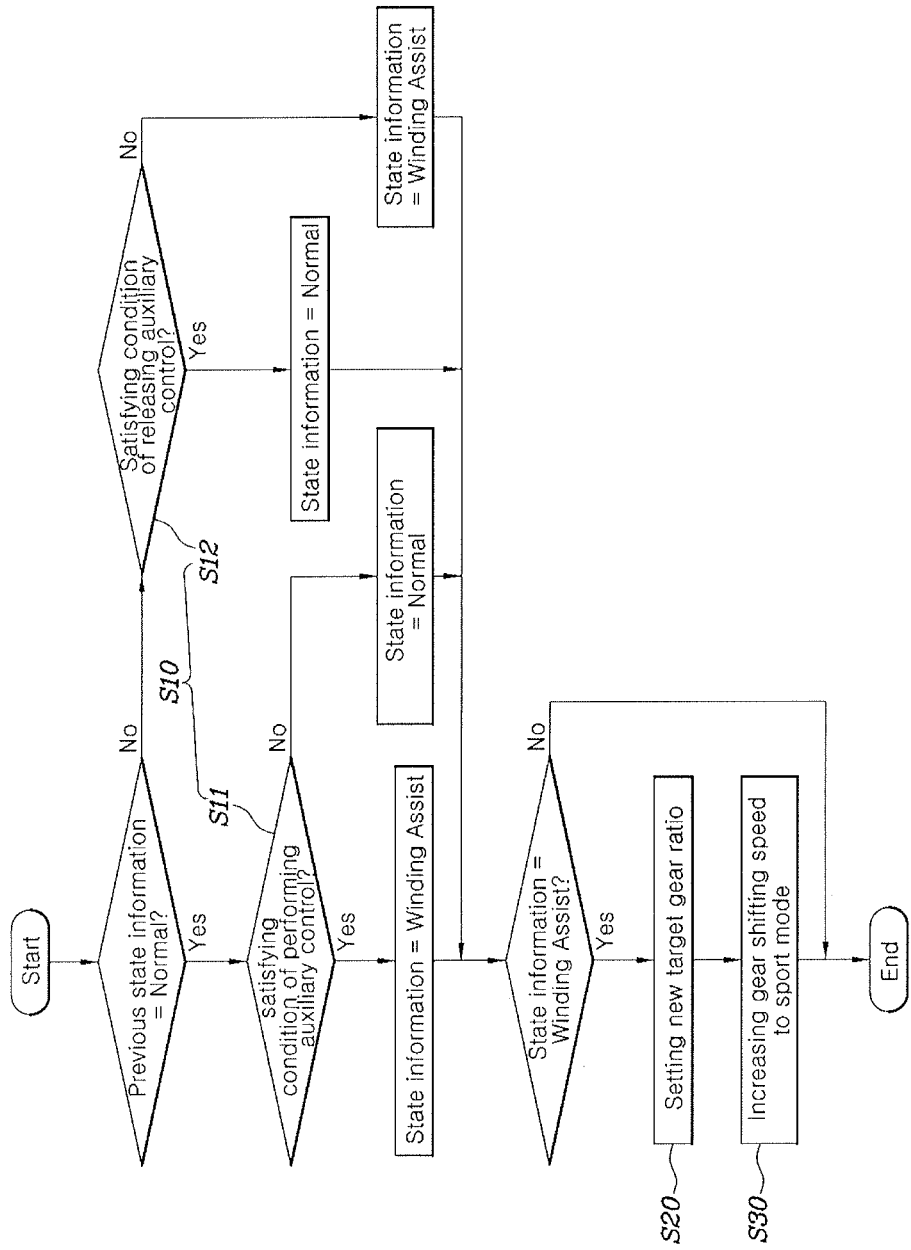
FIG. 2 is a flowchart illustrating a method of controlling driving of a CVT vehicle during cornering according to one exemplary embodiment of the present invention.
Figure 3:
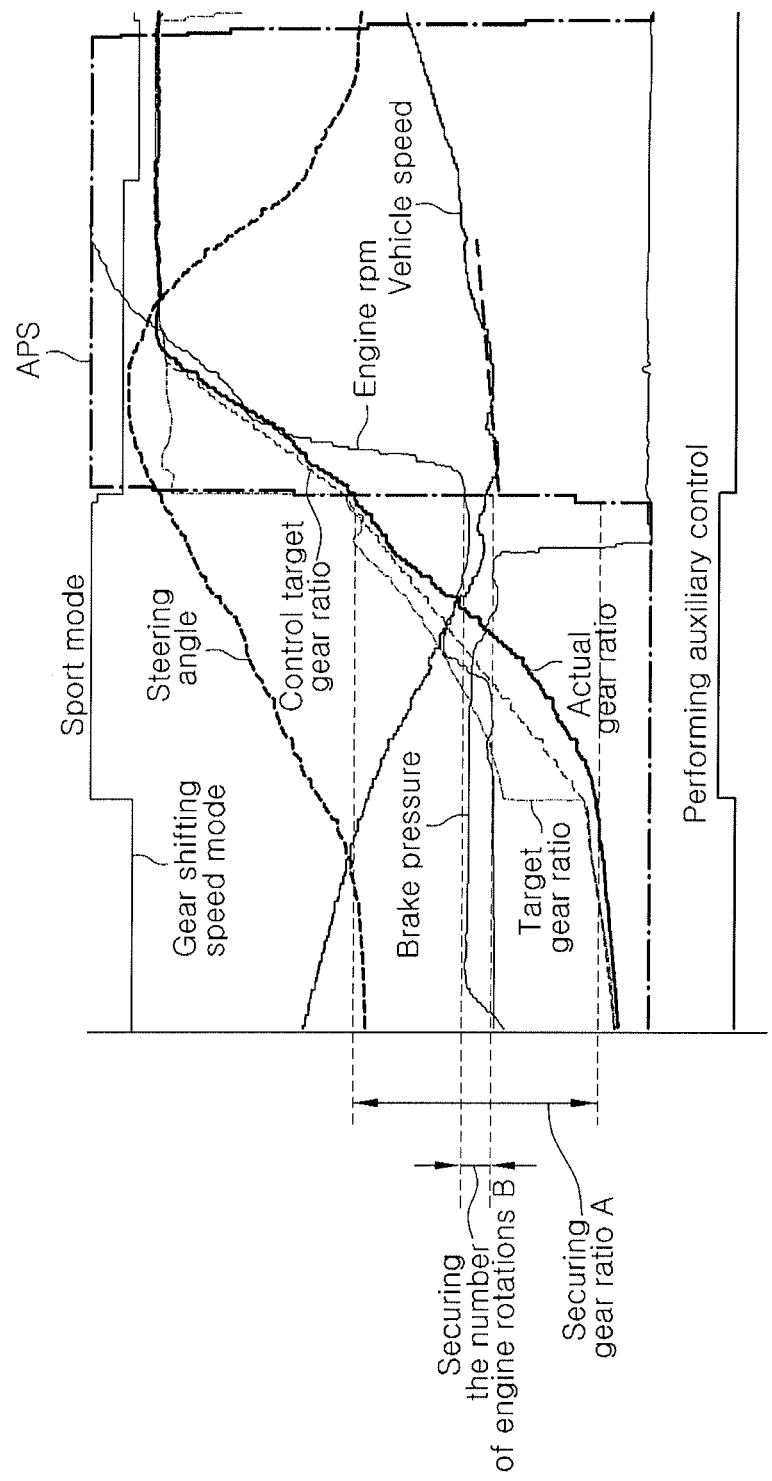
FIG. 3 is a graphical representation illustrating a re-acceleration state of a CVT vehicle to which the control method of the present invention is applied, when entering a corner.

Referring to FIG. 2 and FIG. 3, the method of controlling driving of a CVT vehicle during cornering is performed by the controller CLR. Firstly, the controller CLR determines a traveling state of the CVT vehicle and then determines whether or not it is necessary to perform an auxiliary control process to enhance a re-acceleration response after entering a corner in Step S20. When the auxiliary control process is determined as being necessary (an affirmative determination result), in Step S30, the controller CLR sets a new target gear ratio different from a gear ratio determined according to an existing shift pattern. Next, the controller CLR performs gear shifting of the CVT to follow the new target gear ratio which is set in Step S20.

When the auxiliary control process is determined as being necessary to improve the re-acceleration response after entering a corner, the controller sets a new target gear ratio instead of a gear ratio which is determined based on an existing shift pattern in Step S20 before the driver depresses an accelerator for re-acceleration of the vehicle, that is, while the vehicle is turning the corner. Next, the controller CLR causes gear shifting of the CVT according to the newly set gear ratio in advance, so that the gear ratio and the speed (number of rotations per minute) of the engine that are optimum for the maximum acceleration performance of the vehicle may be secured at a time when the driver actually re-accelerates the vehicle, which greatly reduces a re-acceleration time, resulting in the vehicle rapidly responding to the driver's demand for re-acceleration.

For reference, the existing shift pattern is configured such that a gear ratio of the CVT is determined according to the vehicle speed and the amount of accelerator pedal operation. Regarding the existing shift pattern, since the driver does not normally depress the accelerator pedal while driving a corner, the gear ratio determined according to the existing shift pattern may be low during cornering of the vehicle.

Figure 4:
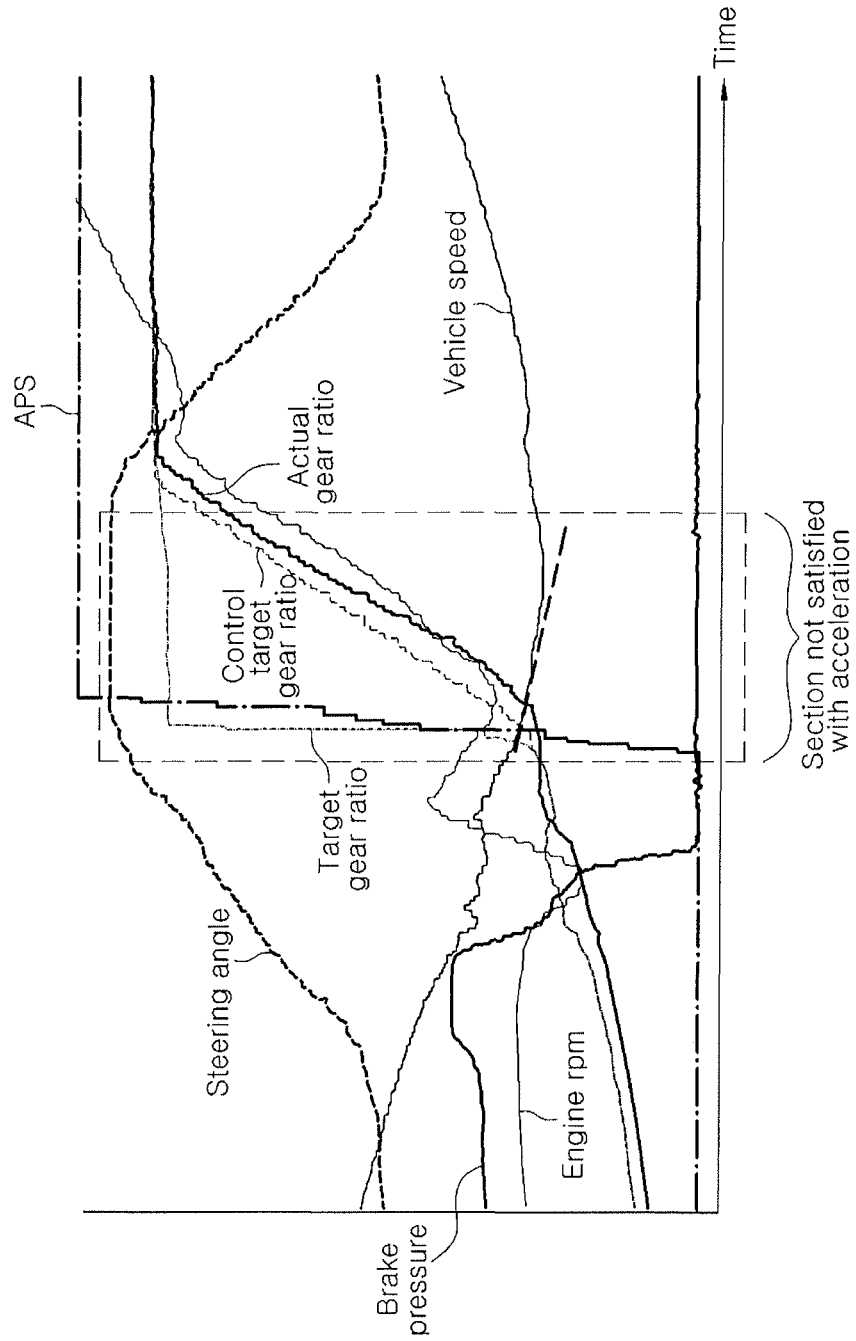
FIG. 4 is a graphical representation illustrating an acceleration delay phenomenon for a vehicle to which the method of the present invention is not applied.

FIG. 4 is a graphical representation illustrating an acceleration delay phenomenon when a vehicle to which the present invention is not applied enters a corner. At first, increasing of steering angle and high brake pressure show that a vehicle enters a corner. Afterwards, i.e. after the vehicle enters the corner, the brake pressure decreases and an accelerator position sensor (APS) signal abruptly rises due to the driver's accelerator pedal operation for re-acceleration. A target gear ratio is a gear ratio which may be provided by the CVT to achieve an acceleration performance demanded by a driver when the APS signal rises. When the target gear ratio determined by the controller is greatly increased to achieve the high acceleration performance, the CVT actually cannot implement such a rapid change in gear ratio. Therefore, the controller is configured to determine a control target gear ratio which is to be used for controlling the CVT to reach the target gear ratio and controls the CVT according thereto, whereby the actual gear ratio of the CVT can follow and reach the target gear ratio.

Thus, when the driver depresses the accelerator pedal deeply for re-acceleration of the vehicle, it takes a relatively long time for the CVT to provide a higher gear ratio for acceleration, compared to an AT or a DCT, and also it takes a long time for the rotation speed of the engine E to change from a low speed required for cornering of the vehicle to a high speed at which a sufficient torque for acceleration may be obtained. Therefore, although the APS signal sharply rises, the vehicle speed decreases for a while and then increases. For the present reason, the driver feels frustrated due to a slow acceleration response.

In contrast to the present case, the present invention is configured to determine whether or not it is necessary to perform an auxiliary control process in the determination step (Step S10) before the driver depresses an accelerator to perform re-acceleration, that is, during cornering of the vehicle, to increase the gear ratio of the CVT and the speed (RPM) of the engine E in advance. Therefore, the gear ratio of the CVT and the rotation speed of the engine E may be rapidly changed to the target gear ratio and the target speed of the engine E at which the torque necessary for acceleration may be obtained as soon as when the driver's intension for re-acceleration is confirmed by the increased APS signal. In the present way, it is possible to greatly improve a re-acceleration response.

In the determination step, Step S10, the auxiliary control process is determined as being necessary when the vehicle speed is greater than a first reference vehicle speed, the gear ratio of the CVT is lower than a first reference gear ratio, the brake pressure is greater than a reference brake pressure, the absolute value of a steering angle is greater than a first reference steering angle, and the rotation speed RPM of a driving pulley RPM is less than a first reference RPM.

The first reference vehicle speed means a criterion to determine whether it is substantially necessary to provide a quick acceleration response. That is, in the case where the vehicle speed exceeds a predetermined level (i.e., the first reference vehicle speed) even during cornering of the vehicle, there is a likelihood that the driver wants to re-accelerate the vehicle immediately after entering the corner. Therefore, in the instant case, it is determined that a quick acceleration response is required after entering the corner. For the present purpose, the first reference vehicle speed may be determined through experiment and analysis that are designed to achieve the above-purpose.

Furthermore, when the gear ratio of the CVT is less than a certain level and the re-acceleration condition occurs after entering a corner, the gear ratio must be abruptly dramatically increased. In the instant case, it takes a considerable time to increase the gear ratio, which may result in deterioration of an acceleration response. For the present reason, it is necessary to perform the auxiliary control process. As a criterion for determining whether it is necessary to perform the auxiliary control process in the instant case, the first reference vehicle speed may be used, and it may be determined through experiment and analysis that are designed to achieve such a purpose.

Furthermore, the first reference steering angle is used to determine whether or not the vehicle is turning a corner. The value of the first reference steering angle may be set to a value indicating a quick cornering state of the vehicle in which the steering is performed with the driver's foot lifting off the accelerator pedal and depressing the brake pedal to reduce the vehicle speed. The value of the first reference steering angle may be determined through experiment and analysis that are designed to achieve such a purpose.

Furthermore, together with the first reference steering angle, the reference brake pressure is also used to confirm the quick cornering of the vehicle in which the driver operates the steering wheel while depressing the brake pedal to reduce the vehicle speed. For the present reason, the reference brake pressure may be determined through experiment and analysis that are designed to achieve the purpose of the present invention.

The first reference RPM is a driving pulley control target RPM to be described later and is used to verify whether the current driving pulley RPM is a level at which the auxiliary control process is required. That is, when the current driving pulley RPM is less than the first reference RPM, it is determined that it is necessary to perform the auxiliary control process to change the current driving pulley RPM to the driving pulley control target RPM.

That is, the auxiliary control process is performed only when it is determined, in Step S10, all of the current vehicle speed, the gear ratio, the brake pressure, the steering angle, and the driving pulley RPM satisfy the set conditions. That is, to secure a quick acceleration response at the time of re-accelerating the vehicle after entering a corner, the gear ratio and the engine speed are increased in advance.

The determination step, Step S10, includes an entry determination step S11 for determining a situation in which it is necessary to perform the auxiliary control process, and a release determination step S12 for determining a condition to release the auxiliary control process as described later.

That is, in the release determination step S12, it is determined that it is necessary to release the auxiliary control process when any one of the following conditions is satisfied: the vehicle speed is equal to or less than a second reference vehicle speed; the gear ratio of the CVT is equal to or greater than a second reference gear ratio; the gear ratio of the CVT is equal to or less than a control target gear ratio determined for substantially controlling the CVT to follow the target gear ratio; the state in which the absolute value of the steering angle is equal to or less than a second reference steer angle continues for a predetermined holding time or longer; and the driving pulley target RPM determined based on the shift pattern is equal to or greater than a second reference RPM.

Here, the second reference vehicle speed is set to be lower than the first reference vehicle speed, the second reference gear ratio is set to be higher than the first reference gear ratio, the second reference steering angle is set to be less than the first reference steering angle to apply a hysteresis to the entry and release of the auxiliary control process. Thus, it possible to perform the auxiliary control process stably once the auxiliary control is started and to reliably maintain the release state after the auxiliary control process is released.

The second reference vehicle speed, the second reference gear ratio, and the second reference steering angle also function as indices indicating a vehicle traveling state in which the auxiliary control process is no longer necessary. Therefore, the second reference vehicle speed, the second reference gear ratio, and the second reference steering angle are determined experimentally and analytically according to the purpose and function, as described above.

In the release determining step S12, it is determined that the release of the auxiliary control process is necessary when the gear ratio of the CVT is equal to or greater than the control target gear ratio determined by the controller configured to control the actual CVT to follow the target gear ratio because it is no longer necessary to continue the auxiliary control process when the target gear ratio of the current control cycle is already equal to or greater than the control target gear ratio which is set in the previous control cycle.

On the other hand, it is also determined that the release of the auxiliary control process is necessary when the state in which the steering angle is less than the second reference steering angle continues for a predetermined holding time or longer. The holding time may be appropriately set to a time required to prevent a misdetection of a steering signal of the steering angle sensor which may be caused by noise or the like.

Furthermore, in the release determination step S12, it is determined that the release of the auxiliary control process is necessary when the driving pulley target RPM obtained based on the shift pattern is equal to or greater than the second reference RPM. This criterion is set to release the auxiliary control process when the auxiliary control process is no longer necessary. That is, when the driving pulley target RPM determined based on the previous shift pattern is already higher than a predetermined level, it is unnecessary to perform the auxiliary control process. For the present reason, the second reference RPM is set to be higher than the first reference RPM and is determined experimentally and analytically according to the purpose and function as described above.

In the gear ratio setting step S20, the value obtained by dividing the driving pulley control target RPM obtained from the map having absolute values of the brake pressure and the steering angle as independent variables and the driving pulley control target RPM as a dependent variable by the driven pulley RPM may be set as the target gear ratio.

With the map, as the brake pressure becomes larger and the absolute value of the steering angle becomes larger, the driving pulley control target RPM tends to have a larger value. Therefore, a larger driving pulley control target RPM is selected when the vehicle is rapidly turning a corner, and thus the gear ratio is also increased to enable the drive wheels W to be provided with a larger torque at the time of re-acceleration.

In the gear ratio setting step S20, the value obtained by dividing the driving pulley control target RPM obtained from the map having the vehicle speed and the driving mode as independent variables and the driving pulley control target RPM as a dependent variable by the driven pulley RPM may be set as the target gear ratio.

The driving pulley control target RPM is set to correspond to a tendency that the driver's likelihood for re-accelerate is generally higher as the vehicle speed is higher during cornering and the driver's likelihood for re-accelerate is higher when the driving mode is a sports mode rather than an economical mode. Therefore, the map is configured such that the higher the vehicle speed is, and the more the drive mode is demanding the sudden acceleration performance such as in a sports mode, the higher the driving pulley control target RPM is determined.

In the gear shifting step S30, the control target gear ratio is determined to follow the target gear ratio set in the gear ratio setting step S20 to perform the shift control of the CVT, in which gear shifting speed is performed at the speed of sports mode, regardless of the currently set traveling mode.

In economical mode or normal mode, the CVT vehicle is controlled to improve fuel economy with a gentle change of the gear ratio, rather than aiming at a sharp change of the gear ratio when it is necessary to perform gear shifting. However, in sports mode, the CVT vehicle is controlled to ignore the fuel consumption and to allow the gear shifting to be performed as fast as the hardware permits. Even though the user selects economical mode or normal mode as the driving mode, rather than the sports mode, in the case where the auxiliary control process is performed, the gear shifting is performed at the same speed as in the sports mode, so that the gear ratio may be more rapidly increased to be prepared for the subsequent reacceleration operation, providing a quick acceleration response as the driver desires.

For reference, according to the exemplary embodiment of the present invention, the processing as in the flowchart of FIG. 2 is repeatedly performed for each control cycle, the entry determination step S11 or the release determination step S12 included in the determining step S10 is performed with reference to the state information set in the previous control cycle, and the result of the determination is stored as the state information to be used in the next control cycle.

According to an exemplary embodiment of the present invention as described above, during cornering of the vehicle, i.e., before the APS signal suddenly rises due to the accelerator pedal operation by the driver, the driving control is performed in sports mode so that the gear ratio may be increased by a value A, and thus the speed (number of rotations) of the engine is increased by a value B due to the increase in the gear ratio, whereby the vehicle speed may rapidly begin to increase as soon as the driver's re-acceleration intension is indicated by the APS signal.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling driving of a continuously variable transmission (CVT) vehicle during cornering, the method being performed by a controller and comprising:
   determining whether it is necessary to perform an auxiliary control process to enhance a re-acceleration response after the vehicle enters a corner, by determining a travelling state of the vehicle;
   setting a target gear ratio instead of a gear ratio which is determined according to a shift pattern when the determining produces a result indicating that it is necessary to perform the auxiliary control process; and
   performing gear shifting such that a gear ratio of a continuously variable transmission (CVT) follows the target gear ratio,
   wherein the performing of the gear shifting is configured such that the gear shifting is performed at a speed set for a sports mode regardless of a driving mode set currently.

2. The method according to claim 1, wherein the determining produces the result indicating that it is necessary to perform the auxiliary control process when following conditions are satisfied:
   a vehicle speed is greater than a first reference vehicle speed; the gear ratio of the CVT is less than a first reference gear ratio; a brake pressure is greater than a reference brake pressure;
   an absolute value of a steering angle is greater than a first reference steering angle; and a driving pulley revolution per minute (RPM) is less than a first reference RPM.

3. The method according to claim 2, wherein in the determining, the controller is configured to determine that it is necessary to release the auxiliary control process when the vehicle speed is equal to or less than a second reference vehicle speed, when the gear ratio of the CVT is equal to or greater than a second reference gear ratio, when the gear ratio of the CVT is equal to or greater than a control target gear ratio determined to control the CVT to follow the target gear ratio, when a state in which an absolute value of the steering angle is equal to or less than a second reference steering angle continues for a predetermined holding time or longer, or when a driving pulley target revolution per minute (RPM) obtained based on the shift pattern is equal to or greater than a second reference RPM.

4. The method according to claim 3, wherein the second reference vehicle speed is set to be lower than the first reference vehicle speed, the second reference gear ratio is set to be higher than the first reference gear ratio, and the second reference steering angle is set to be less than the first reference steering angle.

5. The method according to claim 1, wherein the setting of the target gear ratio is performed by setting, as the target gear ratio, a value obtained by dividing a driving pulley control target revolution per minute (RPM) obtained from a map having absolute values of a brake pressure and a steering angle as independent variables and a driving pulley control target revolution per minute (RPM) as a dependent variable, by a driven pulley RPM.

6. The method according claim 1, wherein the setting of the target gear ratio is performed by setting, as the target gear ratio, a value obtained by dividing a driving pulley control target revolution per minute (RPM) obtained from a map having a vehicle speed and a driving mode as independent variables and a driving pulley control target revolution per minute (RPM) as a dependent variable, by a driven pulley RPM.

* * * * *